3,513,975
FILTER
John Edward Russell, Yarm, England, assignor to British Titan Products Company Limited, Durham, England, a corporation of the United Kingdom
Filed Jan. 10, 1969, Ser. No. 790,303
Claims priority, application Great Britain, Jan. 13, 1968, 2,016/68
Int. Cl. B01d 33/38
U.S. Cl. 210—77                26 Claims

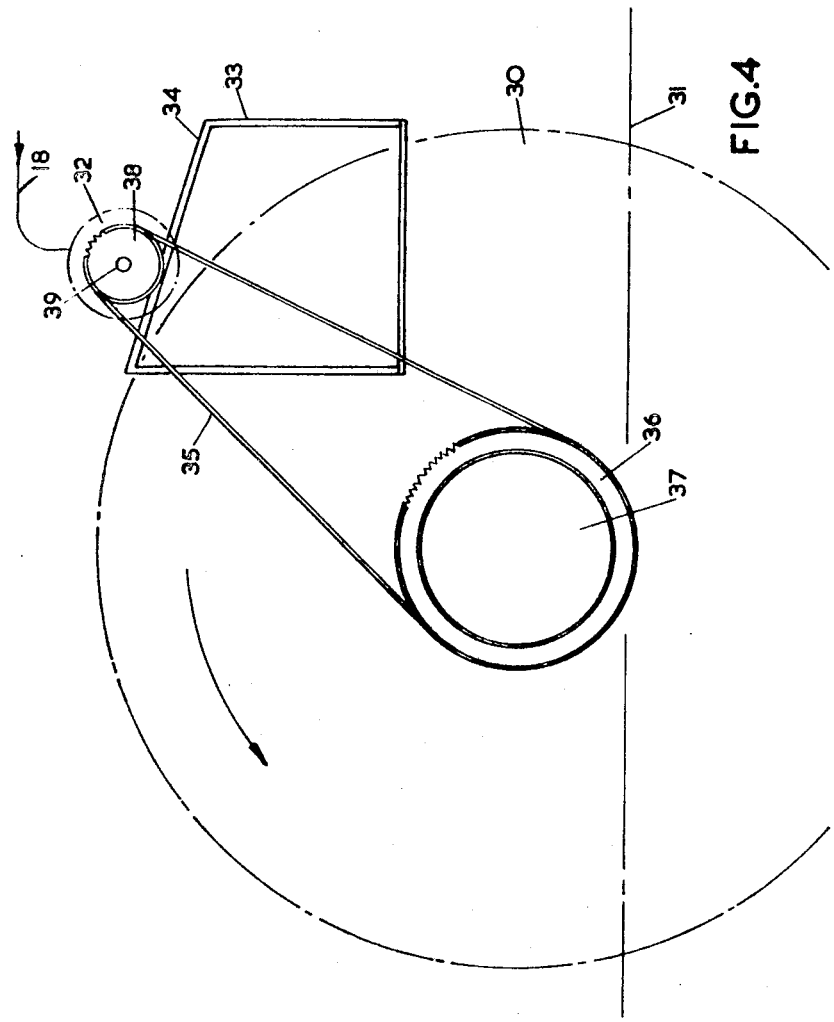

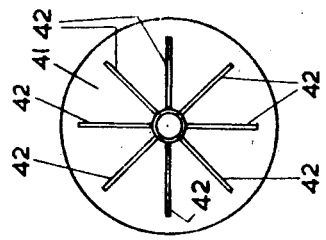
FIG. 6
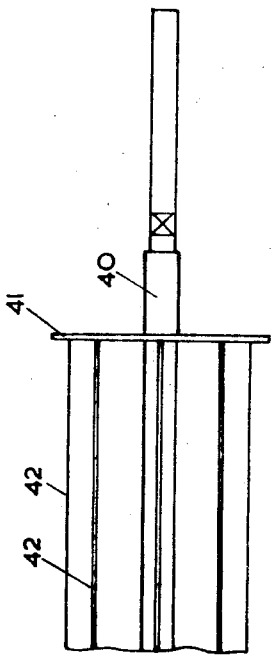
FIG. 5
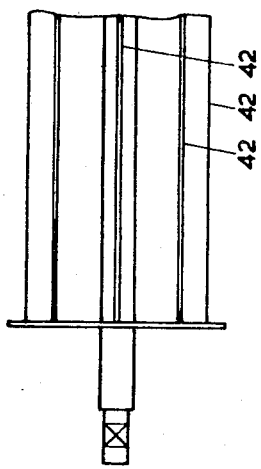

ABSTRACT OF THE DISCLOSURE

A rotary filter having a rotatable drum with a filtration surface, a tank or bosch mounted so that at least a portion of the surface of the drum is rotatable within the tank or bosch and a rotatable vane feeder having at least four troughs mounted parallel to the axis of the drum and positioned above the horizontal axial plane to the drum to feed a liquid or suspension to be filtered to the surface of the drum. Means to rotate the drum and the feeder are incorporated and means to supply to the vane feeder a liquid or suspension to be filtered.

---

This invention relates to an improved filter, particularly to a rotary filter.

According to the present invention a rotary filter comprises a rotatable drum, the surface of which forms a filtration surface, a tank or bosch and a rotatable vane feeder, the vanes of which define at least four troughs extending substantially parallel to the axis of the drum and mounted to be rotatable in a position above the horizontal axial plane of the drum to feed a liquid or a suspension from the rotatable feeder to the surface of the drum and means to rotate the drum and the vane feeder.

Rotary filters commonly comprise a drum mounted for rotation so that the lower portion of the surface of the drum is passed through a liquid suspension to be filtered contained in a tank or bosch positioned beneath the drum. Vacuum exhaust means are usually provided, internally of the drum to apply suction to the interior surface of the drum so that the surface, as it passes through a liquid suspension contained in the tank or bosch, picks up the material to be filtered and exhausts the filtered liquid or filtrate whilst the drum rotates through this pick-up region and a subsequent draining region. On further rotation the drum surface passes through a discharge region where the material on the surface of the drum is discharged.

It is desirable often to supply an additional quantity of the suspension to be filtered or a washing liquid to the surface of the drum after it has rotated through the liquid suspension in the bosch and the present invention provides a convenient way of doing this.

The normal pick-up zone extends over an arc subtending an angle of about 100–120° at the centre of the drum and when the additional quantity of suspension to be filtered is applied to the surface of the drum then this pick-up zone is increased to an arc which subtends an angle of about 200° at the centre of the drum. However, the increased area of pick-up is not usually as effectively covered by the suspension as the original so the throughput rate of the filter does not increase pro rata with the angular increase. Nevertheless, a considerable improvement in the throughput of the filter is obtained. The surface area for draining the water from the cake deposited on the surface of the filter is decreased considerably but this does not affect the constitution of the dewatered paste substantially because the drainage process largely occurs in the first 60° of arc after filtration. The solids content of the cake will fall from about 52–54% when no additional quantity of suspension is applied to 48–52% when additional suspension is applied through the rotary vane feeder when used for the filtration of a titanium dioxide slurry. This will depend, however, on the exact nature of the cake being dewatered.

The provision of a rotatable vane feeder defining at least four troughs and mounted in a position so that it feeds liquid suspension or a washing liquid on rotation from the troughs to the surface of the drum, ensures an even rate of feeding to, and an even spread of the additional liquid suspension or washing liquid across, the filterable surface of the drum. Because each segment is drained in turn, the feeder does not suffer from blockages common with static feeders such as spray jets or by using a static trough.

The rotatable vane feeder preferably defines five or more troughs and can comprise a shaft member, which may be solid or tubular, having radially disposed a number of vanes between end plates secured to the tubular shaft member. The rotatable feeder is mounted so that its longitudinal axis is substantially parallel to the axis of the drum and will usually be carried on a driving shaft which is supported on bearings on a support structure usually formed integrally with, or attached to, the rotatable filter structure and having means for driving the rotatable vane feeder about its axis.

The rotatable vane feeder can be formed of any suitable material depending on its use but will usually be formed from metal such as aluminium or steel. Depending on its use, the vane feeder can have a protective coating of, for example, polytetrafluoroethylene, rubber, enamel or paint.

The rotatable filter according to the present invention incorporates means for rotating the drum about its axis so that its surface moves through a pick-up region, a drainage region or further application region and/or washing region, and a discharge region. The drum and the rotatable vane feeder. By suitable choice of gearing the driving means, if desired, and the feeder can be driven by, for example, a belt or a drive chain mounted on a pulley or sprocket carried by the shaft for the drum and a pulley or sprocket attached to the drive shaft carrying the rotatable vane feeder. By suitable choice of gearing the speed of rotation of the rotatable vane feeder can be at the desired rate.

Preferably the rotatable vane feeder is mounted within an angle of 45° to the vertical plane passing through the axis of the drum and preferably is mounted above the ascending face of the drum. Usually the direction of rotation of the feeder is the same as that for the drum, i.e. if the drum rotates in an anti-cockwise direction then the rotatable vane feeder is rotated likewise in an anti-clockwise direction.

The rotary filter according to the present invention includes means for feeding a liquid or a suspension into the troughs of the rotatable vane feeder as it rotates and such means usually comprise one or more feed pipes to feed a fluid downwardly into a trough as it is rotated beneath the feed pipe(s).

The speed of rotation of the rotatable vane feeder is adjusted so that the supply of liquid or suspension to the drum surface from the feeder as it rotates is as even as possible not only in the sense of being a continuous feed to the drum surface but also in the sense of being an even feed across the surface of the drum. The speed of rotation of the feeder depends on the number of troughs and on the rate of supply of liquid or suspension to the feeder. The speed is chosen so that there is little or no splashing from the feeder device and usually the lower the speed then the less chance of splashing but also the speed is preferably sufficiently high to ensure even feeding. In addition, the speed must be sufficient to permit the liquid or suspension fed to the troughs to distribute itself along the length of the trough prior to discharge from the trough to the drum surface.

The drum surface is usually provided with a number of apertures connected on the undersurface of the drum to a series of pipes to apply suction across the surface of the drum to effect the filtration operation. Usually the drum surface will be provided with a filter medium such as a filter cloth or a layer of diatomaceous earth and in addition may have a grid between the surface and the cloth, if desired. Various means for discharging the cake carried by the filter can be incorporated, if desired, typical means being the application of a positive air pressure from the interior of the drum, the use of a series of strings passing around the circumference of the drum and over a discharge member so that the cake follows the contour of the string away from the surface of the drum in the discharge region or the use of a discharge knife which removes a layer of the cake as the drum surface rotates. The discharge knife may either be attached directly to the main drum or to a subsidiary roller. This serves to release the cake from the main drum surface and transfer it a distance away from the main drum before the knife discharges the cake downwardly.

As stated, the rotatable vane feeder can be used to supply to the drum surface a liquid suspension to be filtered or a wash liquid. In the case of a suspension it possesses the advantage that this is not required to pass through narrow slots or spray jets which may be clogged by the solid material and is self-cleaning. It has been found that the capacity of the filter when employed for the filtration of a suspension without washing is substantially increased.

A typical material which may be filtered and/or washed by employing the rotary filter of the present invention is a slurry of titanium dioxide.

Generally, in operation, rotary filters not only rely on a filter medium being present on the surface of the drum to ensure adequate filtration but also on the cake on the surface of the drum picked up as it passes through the material to be filtered. Additional material to be filtered is easily applied to the already formed cake by the rotatable vane feeder.

Two forms of rotary filter constructed in accordance with the invention will now be described by way of example only with reference to the accompanying drawings in which:

FIG. 4 is a diagrammatic end view of an alternative form of filter, FIG. 5 shows details of the rotatable vane feeder of the filter of FIG. 4, and FIG. 6 is a section through the rotatable vane feeder of FIG. 5.

Figure 1:
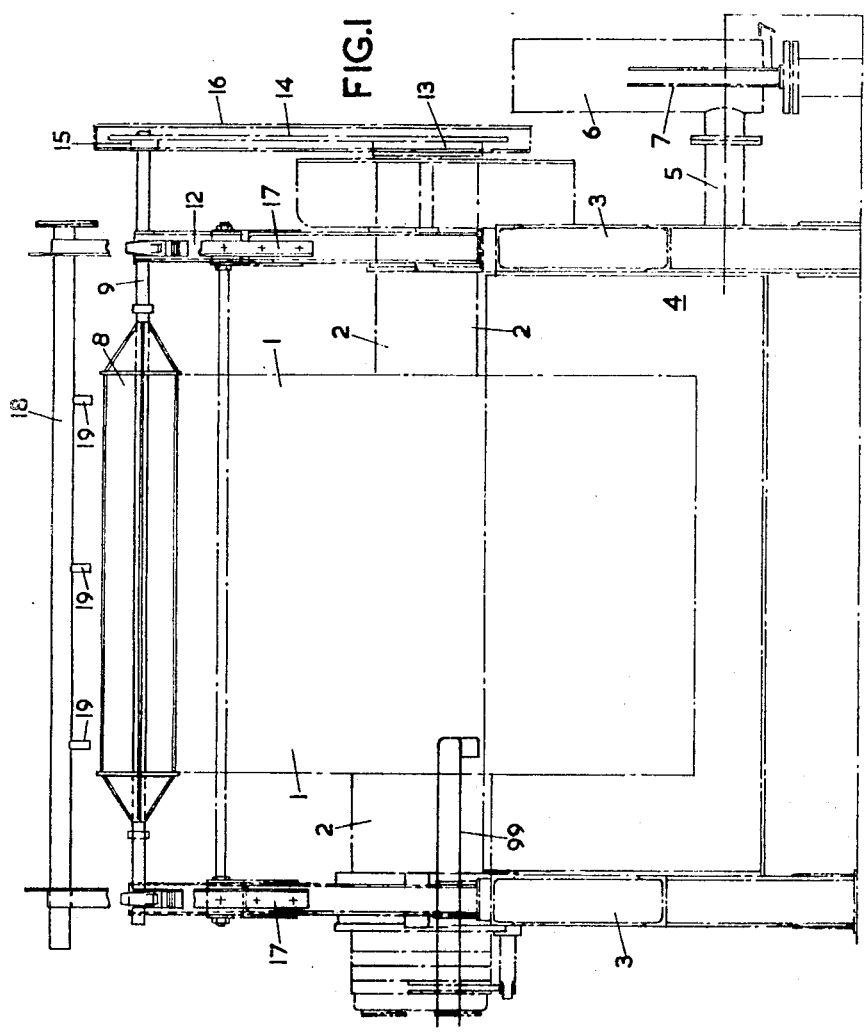
FIG. 1 is a rear elevation of a rotary filter.
Figure 2:
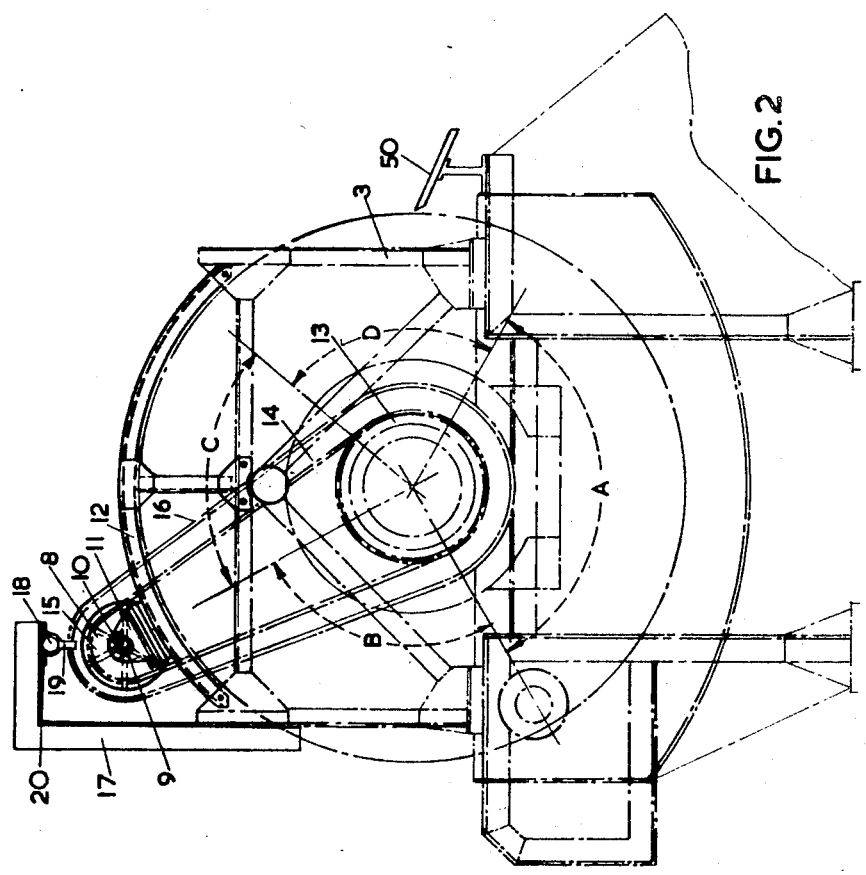
FIG. 2 is an end elevation of the filter.
Figure 3:
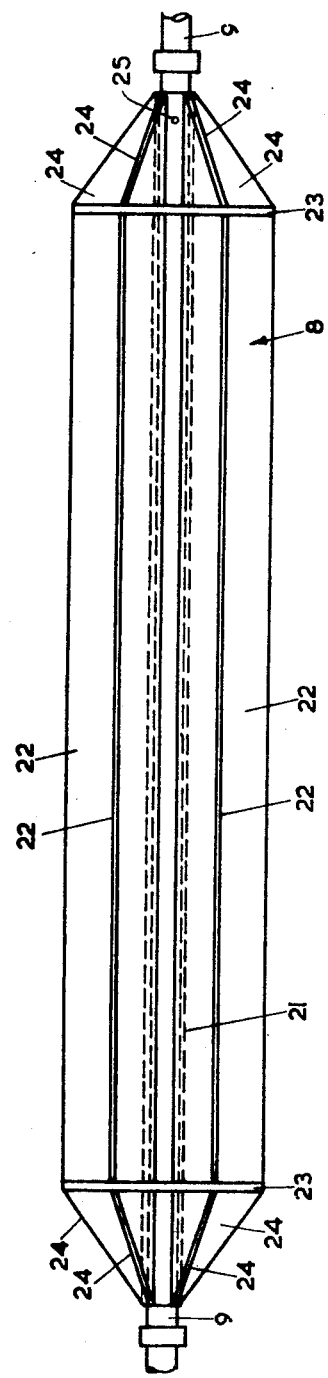
FIG. 3 shows details of the rotatable vane feeder of the filter in accordance with FIGS. 1 and 2.

As shown in FIGS. 1 and 2, the rotary filter comprises a drum member 1 carried on trunnions 2 rotatably mounted in a framework 3 for the filter. Mounted within the framework 3 is a tank or bosch 4 positioned so that the lower part of the surface of drum 1 lies within it. The bosch 4 is able to be supplied with a liquid suspension through pipe 99. The level of liquid suspension to the bosch 4 is maintained by the suspension flowing through pipe 5 into standpipe 6, and overflowing down weir pipe 7. A rotatable vane feeder 8 shown in more detail in FIG. 3 is mounted on the framework 3 above the mid-horizontal axial plane of the drum 1 on the ascending face of the drum. The rotatable vane feeder 8 is mounted on a shaft 9 mounted in bearings 10 in bearing support members 11 carried on a radiused support member 12 which is attached to the support member 3. One of the trunnions 2 carries a sprocket 13 provided with a drive chain 14 to drive a sprocket 15 mounted on the end of the shaft 9 carrying a rotatable vane feeder. The chain 14 is enclosed in a chain case 16.

The filter is provided with a discharge knife 50 mounted on the support framework to discharge cake from the surface of the drum.

Attached to the supporting framework 3 are support members 17 supporting a supply pipe 18 equipped with three nozzles 19 to supply a wash liquid or a liquid suspension to be filtered to the rotatable vane feeder 8. The supply pipe 18 is secured to the support members 17 by means of U-shaped support members 20.

As shown in FIG. 2, the pick-up zone A extends over approximately 110° to 120°, the extra filtering zone for pick-up zone B extends over approximately 90° and the dewatering zone C extends over approximately 70°. The discharge zone is indicated at D.

As shown in FIG. 3, the rotatable vane feeder 8 consists of a tubular support 21 having attached thereto six vanes 22 equiangularly spaced and radially disposed on the tubular support 21. End plates 23 are attached to the tubular support 21 and to the vanes 22. The tubular support 21 extends beyond the end plates 23 and triangular shaped vanes 24 aligned with the vanes 22 are mounted on this extension. The feeder 8 is secured for retention with the shaft 9 by means of a screw 25.

In operation, the bosch 4 is maintained at the desired level with a liquid suspension to be filtered, typically a suspension of titanium dioxide, through inlet pipe 99 and overflowed through weir pipe 7. Drum 1 is rotated so that its surface passes through the liquid suspension contained in the bosch 4 and suction applied to the position of the drum surface whilst it rotates through the bosch 4. The drum surface will usually be provided with a filter medium such as a filter cloth to effect the filtration and the build-up of a cake of the material being filtered. As the drum surface ascends from contact with the liquid suspension, the liquid is drained through the surface of the drum which is provided with a number of apertures, not shown, and supplied with a further amount of liquid suspension from the rotatable vane feeder 8. The rotatable vane feeder is rotated constantly and fed with a supply of the liquid suspension via nozzles 19 from the supply pipe 18. Drainage of the liquid medium and filtration of the solid is maintained by the application of suction through the surface of the drum until on the descending face of the drum the suction is released and the filter cake built up on the drum discharged by the discharge knife 50.

As shown in FIG. 4, an alternative rotary filter has a drum 30 mounted for rotation within a bosch indicated at 31. A rotatable vane feeder 32 is incorporated to supply a liquid medium to the surface of the drum as it rotates and the vane feeder 32 is mounted on a support 33, the upper member 34 of which provides means whereby the position of the rotatable vane feeder 32 can be adjusted to that desired. The rotatable vane feeder 32 is rotated by means of a drive chain 35 mounted on sprocket 36 on the shaft 37 of the drum 30 and on sprocket 38 on the shaft 39 of the rotatable vane feeder 32.

The rotatable vane feeder as shown in FIGS. 5 and 6 comprises a tube member 40 having attached to it end plates 41 between which are mounted eight vanes 42 radially disposed equiangularly on the tube 40.

The filter operates in a manner analogous to that shown in FIGS. 1, 2 and 3.

The invention is further described in the following example:

EXAMPLE

An aqueous slurry containing approximately 400 grams per litre of titanium dioxide was dewatered on a rotary filter substantially as shown in FIGS. 1 and 2. The drum surface had a face size of 5 feet x 4 feet. In one experiment, additional slurry was fed through the rotary vane feeder to the upper surface of the drum and in another experiment, additional slurry was not supplied.

When additional slurry was supplied to the surface of the filter, the mean thickness of the cake after dewatering was 0.68 inch and it had a mean solids content of 44%. In the experiment where no additional slurry was fed to the surface of the filter, the cake had a mean thickness after dewatering of 0.61 inch and a mean solids content of 47.1%.

There was an increase in throughput of the filter of approximately 30%.

It is to be expected that the use of the rotary vane feeder enables an increase of throughput to be obtained under certain circumstances of up to 40%. The use of the rotary vane feeder permits an even distribution and continuous supply of additional slurry to the surface of the drum and avoids the blocking of jets and of static troughs which have been a disadvantageous feature of previously proposed rotary filters having a top feed arrangement.

What is claimed is:

1. A rotary filter comprising a rotatable drum, the surface of which forms a filtration surface, means for applying a suction to the interior of said drum, a tank or bosch capable of holding a liquid suspension to be filtered and positioned such that a portion of the surface of said rotatable drum lies within said tank or bosch to pass through said liquid suspension, and a rotatable vane feeder having the vanes which define at least four troughs extending substantially parallel to the axis of the drum and said feeder being mounted to be rotatable in a position above the horizontal axial plane of the drum to feed a liquid or a suspension from the rotatable feeder to the surface of the drum and means to rotate the drum and vane feeder.

2. A rotary filter according to claim 1 wherein the rotatable vane feeder is provided with vanes which define at least five troughs.

3. A rotary filter according to claim 1 wherein the rotatable vane feeder comprises a shaft member, a number of vanes being radially disposed around the shaft and end plates secured to the shaft member.

4. A rotary filter according to claim 3 wherein the shaft member is a solid shaft member.

5. A rotary filter according to claim 3 wherein the shaft member is a tubular shaft member.

6. A rotary filter according to claim 5 wherein the rotatable vane feeder is carried on a shaft for rotating said feeder.

7. A rotary filter according to claim 1 wherein the rotatable vane feeder is formed of metal.

8. A rotary filter according to claim 7 wherein the rotatable vane feeder has a protective coating on its surface.

9. A rotary filter according to claim 8 wherein the protective coating is formed from polytetrafluoroethylene.

10. A rotary filter according to claim 1 wherein the rotatable vane feeder is mounted within an angle of 45° to a vertical plane passing through the axis of the drum.

11. A rotary filter according to claim 1 wherein the rotatable vane feeder is mounted above the ascending face of the drum.

12. A rotary filter according to claim 1 wherein the rotatable vane feeder is mounted to rotate in the same direction as the drum.

13. A rotary filter according to claim 1 wherein means for feeding a liquid or a suspension into the troughs of the rotatable vane feeder are provided.

14. A rotary filter according to claim 13 wherein said means comprises one or more feed pipes.

15. A rotary filter according to claim 1 wherein rotation of said drum and the rotatable vane feeder is effected by a common driving means.

16. A rotary filter according to claim 15 wherein gear means are incorporated to effect the desired speed or rotation of the rotatable vane feeder with respect to that of the drum.

17. A rotary filter according to claim 1 wherein the surface of the drum has a number of apertures connectable to a series of pipes to apply the suction to the surface of the drum to effect filtration.

18. A rotary filter according to claim 17 wherein said surface of the drum is provided with a filter medium.

19. A rotary filter according to claim 18 wherein said filter medium is a cloth.

20. A rotary filter according to claim 19 wherein a grid is positioned between the surface of the drum and the cloth.

21. A rotary filter according to claim 1 having means for discharging the cake formed on the surface of the drum after filtration.

22. A rotary filter according to claim 21 wherein said means for discharging the cake comprises means for applying a positive air pressure to the surface of the drum to effect said discharge.

23. A rotary filter according to claim 21 wherein said means for discharging the cake comprises a series of strings passing around the circumference of the drum and over a discharge member positioned away from the surface of the drum to effect said discharge.

24. A rotary filter according to claim 21 in which said means for discharging the cake comprises a discharge knife.

25. A process for filtering a suspension containing solid material which comprises rotating a rotatable drum having a filtration surface within a tank or bosch containing the suspension to be filtered, applying suction to the surface of the drum to deposit on the surface a layer of the solid material to be filtered and to withdraw liquid to the interior of said drum, applying, whilst still maintaining suction, to the surface of the drum after passing through the tank or bosch, a further supply of the suspension to be filtered from a rotating vane feeder, the vanes of which define at least four troughs extending substantially parallel to the axis of the drum and being mounted above the horizontal axial plane of the drum, applying suction to the surface of the drum after feeding a liquid or an additional quantity of the suspension to be filtered to remove liquid from the solid material deposited on the surface of the drum and discharging the solid material from the surface of the drum.

26. A process according to claim 25 wherein the suspension to be filtered is an aqueous suspension of titanium dioxide particles.

References Cited

UNITED STATES PATENTS

| | | | |
|---|---|---|---|
| 2,139,445 | 12/1938 | Dinwiddie | 210—217 X |
| 2,963,158 | 12/1960 | Jung | 210—404 X |
| 3,075,646 | 1/1963 | Giesse | 210—409 X |

REUBEN FRIEDMAN, Primary Examiner

T. A. GRANGER, Assistant Examiner